US012216784B1

(12) United States Patent
Ugwonali et al.

(10) Patent No.: US 12,216,784 B1
(45) Date of Patent: Feb. 4, 2025

(54) SYSTEMS AND PROCESSES FOR SYNCHRONIZING DISPARATE APPLICATIONS

(71) Applicant: MedTrans Go, Inc., Atlanta, GA (US)

(72) Inventors: Obinwanne Ugwonali, Atlanta, GA (US); Dana Weeks Ugwonali, Atlanta, GA (US)

(73) Assignee: MedTrans Go, Inc., Atlanta, GA (US)

( * ) Notice: Subject to any disclaimer, the term of this patent is extended or adjusted under 35 U.S.C. 154(b) by 314 days.

(21) Appl. No.: 17/831,214

(22) Filed: Jun. 2, 2022

Related U.S. Application Data

(60) Provisional application No. 63/196,028, filed on Jun. 2, 2021.

(51) Int. Cl.
| | |
|---|---|
| *G06F 21/00* | (2013.01) |
| *G06F 9/54* | (2006.01) |
| *G06F 16/27* | (2019.01) |
| *G06F 21/62* | (2013.01) |

(52) U.S. Cl.
CPC .......... *G06F 21/6218* (2013.01); *G06F 9/542* (2013.01); *G06F 9/547* (2013.01); *G06F 16/27* (2019.01)

(58) Field of Classification Search
CPC ...... G06F 21/6218; G06F 9/542; G06F 9/547; G06F 16/27
See application file for complete search history.

(56) References Cited

U.S. PATENT DOCUMENTS

| | | | |
|---|---|---|---|
| 10,394,889 B1* | 8/2019 | Lindblad | G06F 16/3338 |
| 2015/0112700 A1* | 4/2015 | Sublett | G16H 40/20 705/2 |
| 2017/0193412 A1* | 7/2017 | Easton | G06Q 10/06313 |
| 2019/0138318 A1* | 5/2019 | Yang | G06F 9/448 |
| 2021/0243571 A1* | 8/2021 | Gibbs | H04W 4/12 |

\* cited by examiner

*Primary Examiner* — Ghazal B Shehni
(74) *Attorney, Agent, or Firm* — Husch Blackwell LLP; Bryan D. Stewart; Sydney Forsander

(57) ABSTRACT

Systems and processes for synchronizing disparate applications are described herein. In various embodiments, the process includes: (1) receiving and validating a log-in request; (2) receiving a request submission comprising a plurality of data items; (3) writing the plurality of data items into a dynamic and scalable data model; (4) determining request parameters associated with the plurality of data items; (5) determining a recommended deployment strategy based on the one or more parameters and characteristic values stored in the data model; (6) generating a and transmitting one or more notifications according to the recommended deployment strategy; and (7) generating and/or modifying a display based on the notification(s).

16 Claims, 11 Drawing Sheets

SYSTEMS AND PROCESSES FOR SYNCHRONIZING DISPARATE APPLICATIONS

CROSS-REFERENCE TO RELATED APPLICATIONS

This application claims the benefit of and priority to U.S. Patent Application No. 63/196,028 filed Jun. 2, 2021, entitled "SYSTEMS AND METHODS FOR MEDICAL SERVICE PRESENTATION AND PROCUREMENT," which is incorporated herein by reference in its entirety.

BACKGROUND

Present computing systems used to communicate between applications and integrate with multiple platforms generally lack modularity and flexibility. Existing systems lack the ability to dynamically integrate using a scalable structure that can be used with a plurality of data types and formats without additional data structures and high load processing routines.

BRIEF SUMMARY OF THE DISCLOSURE

Briefly described, and according to one embodiment, aspects of the present disclosure generally relate to systems and processes for synchronizing disparate applications by processing and transforming data. In various embodiments, the disclosed process and system stores and indexes data from a plurality of data sources, in a variety of formats, and then uses processes for validating and transforming the data to manage the synchronization of the data across multiple applications.

In various embodiments, the present system may implement a plurality of application programming interfaces (APIs) and data transformation processes to produce a dynamic data analytics system. In at least one embodiment, the output of the system may include, but is not limited to, a synchronized output based on customized access levels.

In at least one embodiment, the system is configured to automatically (or in response to an input) collect, retrieve, or access a plurality of data items from a plurality of request submission. In some embodiments, the plurality of data items can include data from a large number of sources and applications with varying data types and formats. In various embodiments, the system is configured to automatically analyze, validate, and index data to facilitate synchronization between a plurality of applications and systems, wherein each application can be associated with a third-party service, internal process, or similar. The plurality of data items may be stored in a dynamic data model that utilizes a plurality of collections and collection tables. The system can be configured to request and synchronize data among and between a plurality of collections. In at least this way, the system is modular, flexible, and scalable. In some embodiments, the system utilizes an advanced identification process to index and organize data. The system can further be configured to provide customized portal interfaces based on a plurality of access levels, wherein the plurality of access levels can be modified according to the advanced identification processes described herein.

In one or more embodiments, the present system may include a deployment process integrated with at least the notification sequence and synchronization processes. The system can also be configured to monitor and update a status signal throughout the other systems. In one or more embodiments, the present system may include one or more processes for providing a recommendation for an appropriate partner based on advanced analysis techniques and dynamic modeling of an index of a plurality of request attributes or parameters.

In one or more embodiments, the present system may include one or more processes for facilitating a notification sequence. In various embodiments, the present system may customize the output of the notification sequence according to any of the following or a combination of: the plurality of data items, access levels, collections, and partners.

In one or more embodiments, the present system may transform the plurality of data items from the plurality of request submissions for analysis via the training module processes and other techniques described herein. In at least one embodiment, the present system may clean and transform data to remove, impute, or otherwise modify missing, null, or erroneous data values. In various embodiments, the present system may remove identifying information in order to anonymize and remove any correlated data. Similarly, the system may index and correlate specific data elements, data types, and data sets to facilitate the synchronization and deployment process. In at least one embodiment, the system may include data items from a plurality of requests and partners to create a deployment taxonomy. In certain embodiments, the system may include one or more algorithms to automatically update and train the deployment taxonomy. For example, in some embodiments, data corresponding to the characteristics in the deployment taxonomy can be processed with the one or more algorithms to generate characteristic values. In various embodiments, the system may include an interface for operating and controlling the various facets of the deployment taxonomy and training system as described herein.

According to a first aspect, the present disclosure includes a computing architecture, the computing architecture comprising: a JSON document memory store comprising a collection associated with a particular entity and a particular access level of a plurality of access levels; and a processor communicably connected to the JSON document memory store and configured for: receiving a log-in request from the particular entity; based on receiving the log-in request, providing access to a portal associated with the particular access level of the particular entity; receiving a request from the particular entity via the portal, the request comprising a plurality of data items, the plurality of data items comprising an indication of one or more third-party services; writing the plurality of data items to a particular document associated with the collection; providing at least one of the plurality of data items to the one or more third-party services via a first application programming interface (API); receiving third-party data derived from the particular entity using the one or more third-party services; writing the third-party data to the particular document; and transmitting a portion of the third-party data and at least one data item of the plurality of data items to a notification system via a second API, whereby the notification system transmits a notification to the particular entity.

In a second aspect of the computing architecture of the first aspect or any other aspect, wherein the plurality of access levels comprise administrator, provider, and partner.

In a third aspect of the computing architecture of the second aspect or any other aspect, wherein the third-party data is associated with a request identifier.

In a fourth aspect of the computing architecture of the first aspect or any other aspect, wherein the request is a first request; the plurality of data items are a plurality of first data items; the particular document is a first document; and the processor is further configured for: receiving a second request from the particular entity via the portal, the second request comprising a plurality of second data items, the plurality of second data items comprising an indication of one or more partner services; and writing the plurality of second data items to a second document associated with the collection.

In a fifth aspect of the computing architecture of the fourth aspect or any other aspect, the plurality of second data items further comprises a partner attribute; and the processor is further configured for determining that a particular partner service of the one or more partner services comprises the partner attribute.

In a sixth aspect of the computing architecture of the fifth aspect or any other aspect, wherein the processor is further configured for facilitating a notification to the particular partner service, the notification comprising at least one of the plurality of second data items.

In a seventh aspect of the computing architecture of the first aspect or any other aspect, wherein facilitating the notification to the particular partner service comprises transmitting the at least one second data items to a notification system via a notification API.

In an eighth aspect of the computing architecture of the fifth aspect or any other aspect, wherein the partner attribute comprises a transportation-specific attribute or a language-specific attribute.

In a ninth aspect of the computing architecture of the eighth aspect or any other aspect, wherein the transportation-specific attribute comprises wheelchair accessibility.

According to a tenth aspect of the computer architecture of the ninth aspect or any other aspect, wherein the language-specific attribute comprises speaking a specific language.

In an eleventh aspect, a computing process comprising: receiving, via at least one processor, a log-in request from a particular entity; based on receiving the log-in request, providing access to a portal associated with a particular access level of the particular entity; receiving a request from the particular entity via the portal, the request comprising a plurality of data items, the plurality of data items comprising an indication of one or more third-party services; writing the plurality of data items to a particular document associated with a collection of a JSON document memory store associated with the particular entity; providing at least one of the plurality of data items to the one or more third-party services via a first application programming interface (API); receiving third-party data derived from the particular entity using the one or more third-party services; writing the third-party data to the particular document; and transmitting a portion of the third-party data and at least one data item of the plurality of data items to a notification system via a second API, whereby the notification system transmits a notification to the particular entity.

In a twelfth aspect of the computing process related output of the eleventh aspect or any other aspect, wherein the plurality of access levels comprise administrator, provider, and partner.

In a thirteenth aspect of the computing process related output of the twelfth aspect or any other aspect, wherein the third-party data is associated with a request identifier.

In a fourteenth aspect of the computing process related output of the eleventh aspect or any other aspect, wherein the request is a first request; the plurality of data items are a plurality of first data items; the particular document is a first document; and the computing process further comprises: receiving a second request from the particular entity via the portal, the second request comprising a plurality of second data items, the plurality of second data items comprising an indication of one or more partner services; and writing the plurality of second data items to a second document associated with the collection.

In a fifteenth aspect of the computing process related output of the fourteenth aspect or any other aspect, wherein the plurality of second data items further comprises a partner attribute; and the processor is further configured for determining that a particular partner service of the one or more partner services comprises the partner attribute.

In a sixteenth aspect of the computing process related output of the fifteenth aspect or any other aspect, wherein the processor is further configured for facilitating a notification to the particular partner service, the notification comprising at least one of the plurality of second data items.

In a seventeenth aspect of the computing process related output of the sixteenth aspect or any other aspect, wherein facilitating the notification to the particular partner service comprises transmitting the at least one second data items to a notification system via a notification API.

In an eighteenth aspect of the computing process related output of the fifteenth aspect or any other aspect, wherein the partner attribute comprises a transportation-specific attribute or a language-specific attribute.

In a nineteenth aspect of the computing process related output of the eighteenth aspect or any other aspect, wherein the transportation-specific attribute comprises wheelchair accessibility.

In a twentieth aspect of the computing process related output of the nineteenth aspect or any other aspect, wherein the language-specific attribute comprises speaking a specific language.

These and other aspects, features, and benefits of the systems and processes described herein will become apparent from the following detailed written description taken in conjunction with the following drawings, although variations and modifications thereto may be affected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

Figure 1:
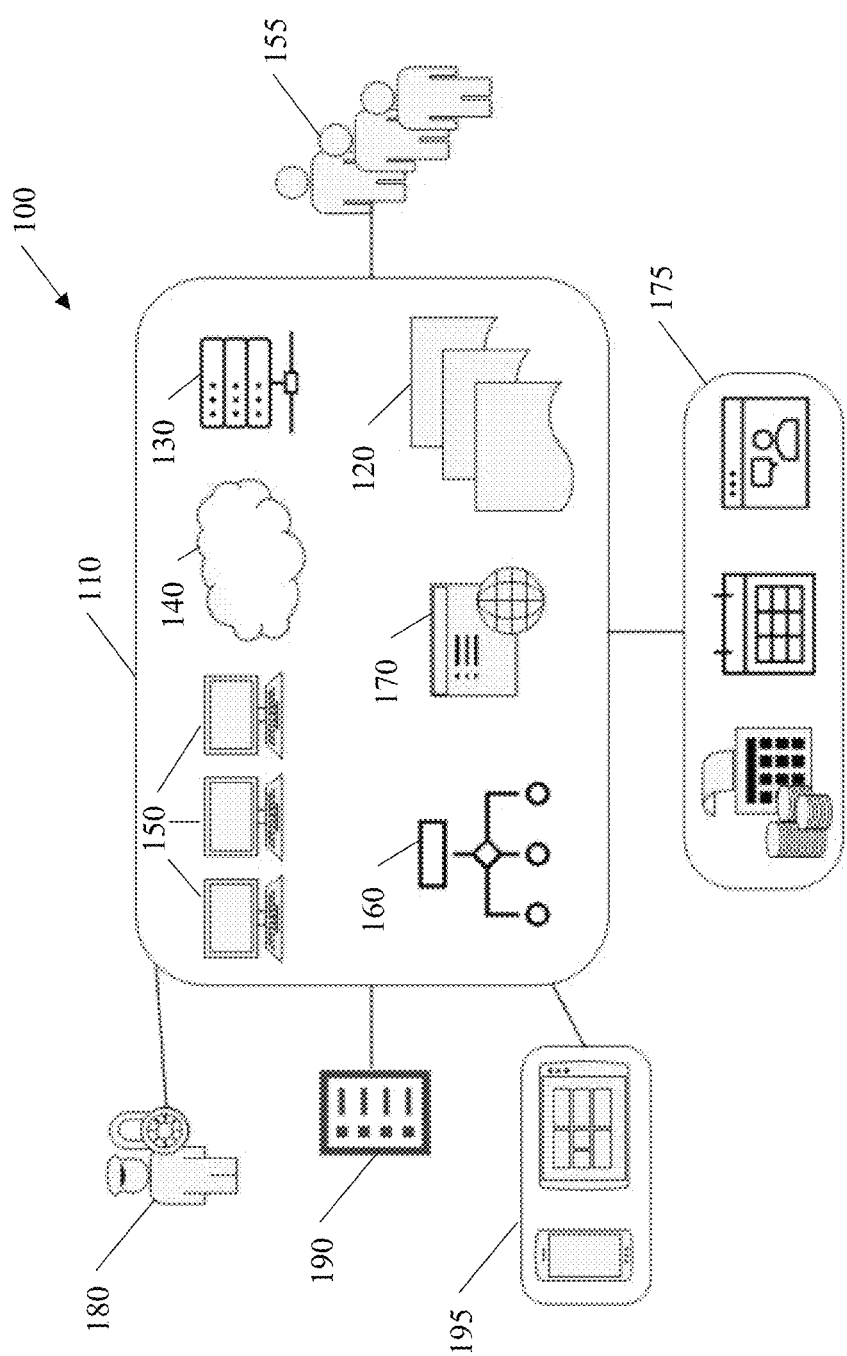
FIG. 1 is a block diagram of a computer architecture system according to embodiments of the present disclosure.

While the disclosure is susceptible to various modifications and alternative forms, specific embodiments thereof are shown by way of example in the drawings and will herein be described in detail. It should be understood, however, that the drawings and detailed description presented herein are not intended to limit the disclosure to the particular embodiment disclosed, but on the contrary, the intention is to cover all modifications, equivalents, and alternatives falling within the spirit and scope of the present disclosure.

DETAILED DESCRIPTION

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Overview

In various embodiments, aspects of the present disclosure generally relate to systems and processes for managing synchronization processes across disparate applications, validation and handling of data items of various formats, and reporting a status of synchronization processes. The system may leverage a plurality of APIs and data transformation processes to produce a dynamic analytics system to provide a customized and synchronized output between a plurality of subsystems and applications.

In some embodiments, the system is a platform for integrating and synchronizing third-party data and services. For example, in at least one embodiment, the system leverages a specific architecture to synchronize data rather than using a relationship database, the system utilizes a flexible and scalable document database management configuration to retrieve and organize data from a plurality of sources and transform the data into a synchronized deployment system that can be customized for a plurality of integrated applications and accounts with varying access levels.

DESCRIPTION OF THE FIGURES

Referring now to the figures, for the purposes of example and explanation of the fundamental processes and components of the disclosed systems and processes, reference is made to FIG. 1, which illustrates a networked system or computer architecture system 100 for use in generating processes as described herein, according to embodiments of the present disclosure. As one skilled in the art will understand and appreciate, the system 100 shown in FIG. 1 (and those of all other flowcharts and sequence diagrams shown and described herein) represents merely one approach or embodiment of the present system, and other aspects are used according to various embodiments of the present system. The steps and processes may operate concurrently and continuously and are generally asynchronous, independent, and are not necessarily performed in the order shown.

FIG. 1 illustrates a networked system or computer architecture system 100 for use in generating synchronization processes (and other processes) as described herein. In various embodiments, the computer architecture system 100 includes a networked system configured to perform one or more processes for advanced data processing and transforming data for executing a deployment process synchronized across a plurality of integrated applications. The computer architecture system 100 may include various computing components (discussed in detail below) configured to communicate over a network 140. The network 140 includes, for example, the Internet, intranets, extranets, wide area networks ("WANs"), local area networks ("LANs"), wired networks, wireless networks, cloud networks, or other suitable networks, or any combination of two or more such networks. For example, such networks can include satellite networks, cable networks, Ethernet networks, and other types of networks. In one embodiment, the network 140 is an isolated private network utilizing a private IP address and limiting access to the network.

As will be understood from discussions herein, various internal and external system components may communicate through one or more APIs. For example, as discussed below, the system includes a data model 120 and a one or more computing devices 130. Continuing with this example, the one or more computing devices 130 may include one or more servers that may access and utilize data from the data model 120 via one or more APIs. As further discussed below, the system includes a webservice integrator 170, which may communicate with one or more third-party applications 175 via APIs.

According to some embodiments, the computing environment 110 includes, but is not limited to, the data model 120, an application load balancer 160, one or more portals 150, and the webservice integrator 170. The elements of the computing environment 110 can be provided via a one or more computing devices 130 that may be arranged, for example, in one or more server banks or computer banks or other arrangements. Such computing devices 130 can be located in a single installation or may be distributed among many different geographical locations. For example, the computing environment 110 can include a one or more computing devices 130 that together may include a hosted computing resource, a grid computing resource, and/or any other distributed computing arrangement. The one or more computing devices 130 can further include one or more routers. In some cases, the computing environment 110 can correspond to an elastic computing resource where the allotted capacity of processing, network, storage, or other computing-related resources may vary over time. In some embodiments, the computing environment 110 can also include an elastic cache configured to scale and adapt based on system demands and available capacity.

In some embodiments, the system can utilize a container deployment system for building, packaging, and deploying microservices to improve speed, flexibility, resource utilizations, and consistency. In one embodiment, the container deployment works with central processing unit ("CPU") localization to determine the allocation of a particular CPU's capacity. In this embodiment (and others), if a CPU allocation is recognized at more than 50%, as a non-limiting example, the container deployment system can automatically scale up, and can similarly scale down when there are less demands on the system.

In various embodiments, the data model 120 generally refers to a dynamic and scalable database that connects or integrates with internal or external systems, databases, or other platforms from which various data is received or collected. In certain embodiments, the data model 120 may include one or more memory devices and be configured as a JavaScript Object Notation ("JSON") document database.

In one embodiment, the data model 120 can integrate and index a plurality of data items from a plurality of data sources. Data items may include data elements of a plurality of different sizes, data types, and formats. For example, data items may include, but are not limited to: strings, numbers, objects, arrays, booleans, nulls, JSON objects, and others. In some embodiments, the data model 120 is configured to accept data items independent of format in order to provide an efficient data interchange between the systems and processes, regardless of data format or data source. Specific examples of data items are discussed herein. Data sources may include databases, third-party applications 175, processes and subsystems internal or integrated with the system 100, and other proprietary and non-proprietary sources.

The data model 120 may leverage a number of suitable memory/data structures. In some embodiments, the data model 120 can include one or more collection tables associated with a particular account 155 and can be used to filter and index data associated with the particular account 155. When used throughout the present disclosure, one skilled in the art will understand that "account" can include an individual, an entity, a provider, a customer, or similar user of the system 100. In some embodiments, the collection tables include pre-defined filters and/or rules that can be configured to target specific resources. The information organized within the collection tables can be transformed and displayed to a plurality of accounts 155 through a plurality of portals 150, configured with a variety of permissions and access levels according to account 155. The data items stored in the data model 120 can be encrypted using one or more known encryption techniques. In some embodiments the data items may be encrypted prior to being written into the data model 120, whereas other embodiments may include encryption of the data model 120 after the data items have been written. Other embodiments may include a combination of encryption techniques or additional information security and data privacy techniques and methods.

In some embodiments, the system includes a data model 120 structured as a dynamic and scalable database, with multiple layers configured to provide flexibility to add to the data model 120 to accommodate development and increasing data processing needs. In one embodiment, the data model 120 includes one or more documents associated with the one or more collection tables, wherein the one or more collection tables are associated with an account 155. The one or more documents can be JSON documents, or other JSON files, in one example. Utilizing one or more documents to store and query information in the data model 120 allows for flexible data manipulation without specific data types or required normalization processes in order to index data. In at least this way, the one or more documents may allow for a any number of fields to be associated with a particular data item.

The system can further be configured to index, sort, and filter data items of data model 120 in order to generate a plurality of reports. In at least this way, the system 100 can create reports regarding data items, requests, notifications, and other information. In these aspects, the system 100 is configured to receive a report request from the webservice integrator 170, or other component of the system 100, compile the data items from the data model 120 required to fulfill the report request, transform or process the data items accordingly to generate the report, and send the data items for the report to be generated by another application. In at least one embodiment, the system 100 may generate the report and send the report via an API to an internal system component or an external system in communication with the system 100.

In one or more embodiments, the application load balancer 160 is configured to receive, process, manage, and distribute data within the computing environment 110. In some embodiments, the application load balancer 160 can include a combination or hardware, software, virtual machine, or other computing device to distribute workload between one or more computing devices 130 or other components of the computing environment 110. The application load balancer can operatively communicate with the one or more computing devices 130 and the third-party applications 175 to improve system efficiencies. In some embodiments, the application load balancer 160 may include a plurality of rules to process incoming data and configure a specified target based on priority according to the plurality of rules.

The plurality of portals 150 can include one or more interactive interfaces to display customized information and requests based on the permissions and access level(s) of a particular account 155. In some embodiments, the portals 150 can include a plurality of tabs, screens, windows, menus, and other options configured to receive a input. In one example, the portals 150 can include, but are not limited to: an interactive form with pre-configured fields to accept request submissions, modify request submissions, view request submissions, input account settings and upload account information, and generate reports. Examples of the plurality of portals 150 may include, but are not limited to, the interface graphics as seen and described in connection to FIGS. 7-11.

As a particular example, when a particular account 155 logs in via the authentication service 180, the system 100 identifies the access level associated with the account. Continuing with this particular example, the system 100 communicates with the data model 120 to retrieve and package a plurality of data items/elements via an API associated with the particular access level associated with that account 155.

The webservice integrator 170 is a dynamic data exchange system utilizing one or more open protocols for communication between a plurality of applications using a plurality of APIs. In some embodiments, the webservice integrator 170 is a communication interface between one or more of the: third-party applications 175, computing environment 110, authentication service 180, notification queue 190, display interfaces 195, and any combination thereof. In some embodiments, the data items retrieved from the data model 120 can be packaged and sent via APIs customized according to the account 155 to be displayed on the one or more portals 150. In this example, the webservice integrator 170 can integrate with the notification queue 190 via APIs to route a notification according to the account 155 to one or more of the third-party applications 175, display interfaces 195, and the one or more portals 150. In some embodiments, the third-party applications 175 can include, but not limited to: payment services, billing, calendaring, interpretation services, and conferencing services. In one non-limiting embodiment, these third-party applications 175 can interface with the webservice integrator 170 to send and receive data items, notifications, information, status updates, requests, and modifications to any of these.

In one or more embodiments, the computer architecture system 100 may also include the authentication service 180, the notification queue 190, and the one or more display interfaces 195. The computer architecture system 100 can be configured to communicate with and integrate with a plurality of third-party applications 175. The authentication service 180 confirms the identity and account 155 by one or more validation techniques. In one embodiment, the authentication service 180 is a web server, which may be one or more of a combination of hardware, software, virtual machine, or similar device that stores, processes, validates, and delivers data to computing devices, including components of the computing environment 110 and third-party applications 175. In one or more embodiments, the authentication service 180 may use, as non-limiting examples: a username and password, personalized token, personal identification number, or biometric data to validate system access associated with a particular account. The authentication service 180 can also be configured to associate a unique identification tag for each account 155, wherein the unique identification tag can be used throughout the deployment and notification systems described herein. The unique identification tag can be used to indicate the specific access level assigned to a particular account 155.

The notification queue 190 can be an application for creating, modifying, and logging events. The notification queue 190 can also generate, update, and push notifications to one or more devices or applications. In some embodiments, the notification queue 190 may be a Java application. In various embodiments, the notification queue 190 is configured to be dynamic, scalable, and integrated with a plurality of third-party applications 175. In some embodiments, the notification queue 190 is configured to receive data items from a plurality of data sources or applications and handle the notification generation and management for the plurality of data sources and/or applications.

Figure 5:
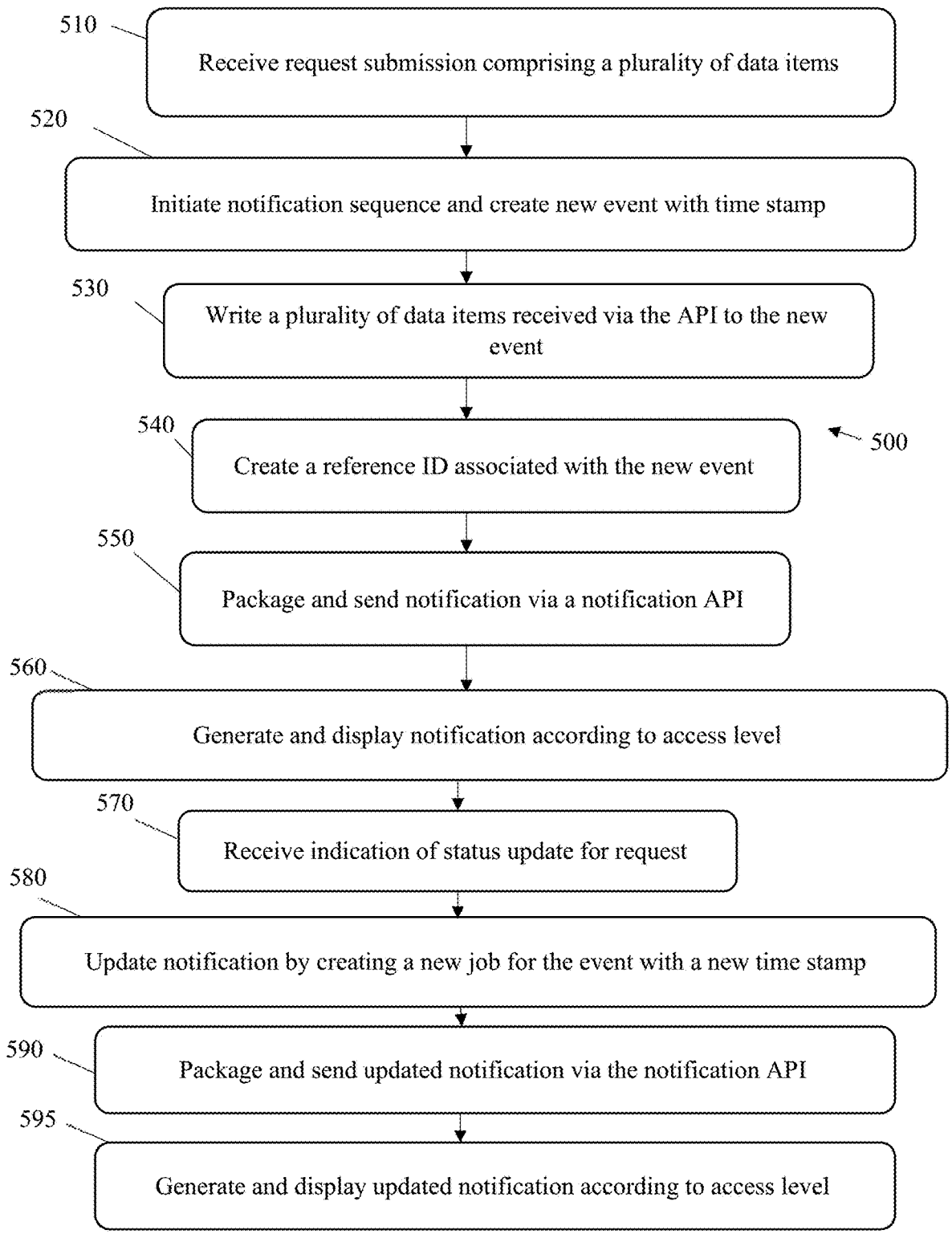
FIG. 5 is a flow diagram of a process for initiating a notification sequence according to embodiments of the present disclosure.

As described in detail in relation to FIG. 5, the notification queue 190 can be configured to create and monitor new events, wherein each event is assigned a unique identification tag and time stamp. Each event can have one or more tasks assigned, each with an individual status, time stamp, and identification. A notification status can be updated automatically via the webservices integrator 170, or in response to receiving a user input or other indication that an event has been modified.

In one example, when a request is a received, the notification queue 190 can create a new event and assign a "pending" status to the event, generate a notification with the plurality of data items relative to the request, package customized notifications via a notification API, wherein the notification API may contain different data items for each of the accounts 155 that may receive the notification. After the notification is distributed to the one or more portals 150 and the request is accepted, the user input triggers the notification queue 190 to update the event status to "confirmed." Similarly, after an event is complete, as indicated by an automatic system update or by user input, the notification queue can update the event status to "completed." The notification queue 190 can further be configured to send reminder notifications and push notifications to multiple users.

The display interfaces 195 can include any suitable computing device interface, including but not limited to: desktop computers, laptop computers, servers, tablets, mobile devices, and other web-based interfaces. In some embodiments, the display interfaces 195 can be configured to display the one or more portals 150. The display interfaces 195 can be integrated with a plurality of third-party applications 175 and utilize the network 140 and/or cloud-based servers to provide seamless synchronization among the components of the system 100. In one example, if a user starts a new request using a display interface 195 that is web-based, and then wants to complete the request using a display interface 195 on a mobile device, the system 100 utilizes the unique identification tag assigned by the authentication service 180 to identify that the same user is accessing a request, and the webservice integrator 170 retrieves the data items associated with the incomplete request and sends the plurality of data items via an API to the mobile display interface 195. In this example, the data items from the incomplete request are saved to the data model 120 as the data items are generated by user input into the display interface 195 and/or the portals 150.

In at least this way, the system 100 utilizes at least the webservices integrator 170 to monitor and synchronize data items sent and received by different components and applications within, integrated with, or communicating with the system 100. The data items can be stored in the data model 120 and retrieved, transformed, and processed to generate notifications using the notification queue 190.

The system 100 may further comprise a deployment system for efficiently distributing requests to one or more partners. In at least one embodiment, the deployment system comprises one or more location monitoring components and score validators. As described in detail in relation to FIG. 4, the deployment system is configured to identify the data items associated with a new request, process those data items to determine specific request attributes or parameters, and identify an appropriate partner to receive a notification for the request, based on a combination of partner capabilities, proximity, and characteristic score.

In some embodiments, the webservices integrator 170 may include, manage, or integrate with the deployment system. Alternatively, the deployment system may be one of the third-party applications 175.

Figure 2:
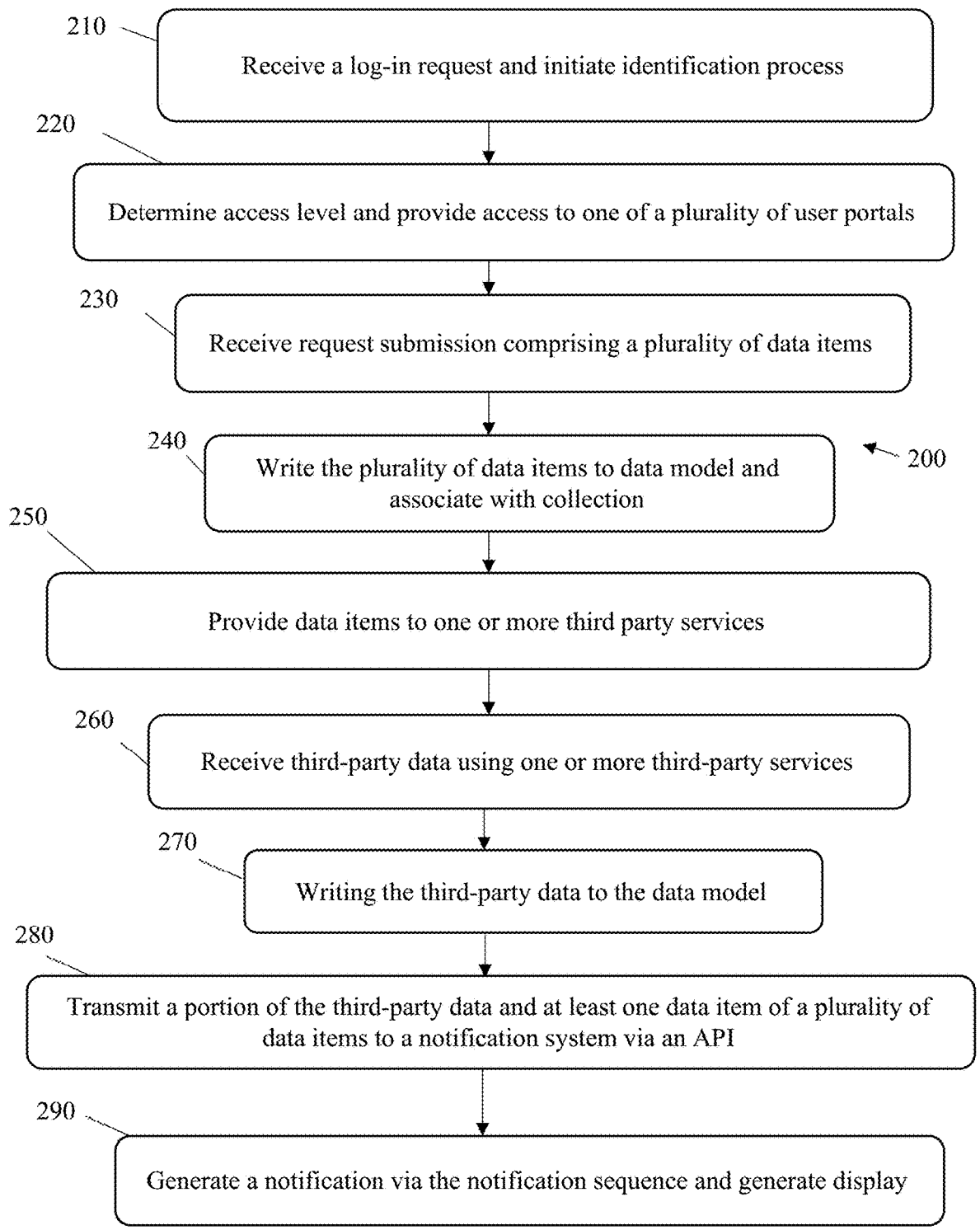
FIG. 2 is a flow diagram of a process for synchronization across disparate applications according to embodiments of the present disclosure.

FIG. 2 illustrates a synchronization process 200 for receiving and processing a request. At step 210, the system 100 receives a log-in request via the authentication service 180. The authentication service 180 may determine the request was transmitted by an approved or pre-registered account 155 by verifying identification credentials like username and password, or other suitable methods of identity authentication. In one embodiment, the authentication service 180 determines if the request is associated with an approved or pre-registered account 155 by sending a request to the data model 120 and comparing if the data items associated with the log-in request match one or more data items stored in the data model 120. If the data items match, the authentication service 180 authenticates the log-in request and retrieves the stored unique identification tag and access level associated with the account 155 from the data model 120. If the credentials do not match an approved or pre-registered account 155, the authentication service 180 may deny access to the system 100 and generate an error message or can communicate the error to the notification queue 190 to generate and display an error message. The failed log-in attempt may further be transmitted and stored in the data model 120.

In one embodiment, when the authentication service 180 determines the credentials do not match an approved or pre-registered account 155, the system may generate a new account, wherein the new credentials can be stored in a memory device (e.g., data model 120) and in a collection table associated with the new account, wherein the new credentials are also assigned a unique identification tag for the new account. As discussed herein, each unique identification tag is associated with a particular account 155 and includes, at least, the account type and access level.

At step 220, the system 100 determines the access level associated with the log-in and generates the portal 150 associated with that access level. At step 230, the portal 150 receives data items via user input into specified fields in a request form. At step 240, the data items are stored in the data model 120 and indexed according to at least one specified form fields. The data model 120 may also assign additional categories or fields associated with a particular data item.

At step 240, the plurality of data items are written to a document, or otherwise associated with, a collection based on the access level and account. If a request is started but not completed, or needs to be modified, the one or more display interfaces 195 may be used to populate the information already entered, as stored in and retrieved from the data model 120.

At step 250, the webservices integrator 170 receives an indication of the new request from the inputs received from the one or more portals 150. In one embodiment, the initiation signal may be sent by the system 100 in response to receiving and storing the plurality of data items associated with the new request at the data model 120.

According to particular embodiments, the system 100 is configured to retrieve and filter the plurality of data items received with the new request from the data model 120 and package the plurality of data items to distribute or provide the data items to one or more third-party services or third-party applications 175 (e.g., via one more APIs managed by the webservices integrator 170). In one embodiment, the webservices integrator 170 packages the plurality of data items and distributes the data packages via APIs to the appropriate third-party application 175.

At step 260, the webservices integrator 170 receives third-party data to fulfill the request, processes the third-party data, identifies missing, incorrect, or incomplete information needed to fulfill the request, and can either repackages and distributes the request or identifies the information as missing and sends an error notification request to the notification queue 190 to generate a notification message.

In step 270, the system writes the third-party data to the data model 120. In some embodiments, the system may transform the received third-party data before writing to the data model 120. In some embodiments, the data model 120 may transform the data. When used throughout the present disclosure, one skilled in the art will understand that "transform" can include normalize, standardize, and other advanced analysis techniques for manipulating the data such that it can be processes, analyzed, and used to generate customized outputs according to the present disclosure. In at least one embodiment, the data transformation can include one or more data modifications such as: 1) imputing missing data; 2) converting data to one or more formats (e.g., for example, converting string data to numeric data); 3) removing extra characters; 4) formatting data to a specific case (e.g., for example, converting all uppercase characters to lowercase characters); 5) normalizing data formats; and 6) anonymizing data elements.

In step 280, the system transmits a portion of the third-party data and at least one data item of the plurality of data items to the notification system via an API. In various embodiments, the system sends the portion of the third-party data and the one or more data items associated with the request from the data model 120 (e.g., where the information was written/stored) to the webservices integrator 170 to be packaged and transmitted via API to the notification queue 190.

In step 290, the notification queue 190 receives the third-party data and at least one data item and initiates a notification sequence, which generates a notification. The notification sequence is described in more detail in relation to FIG. 5 below. The notification generated by the notification queue 190 is transmitted via a notification API to be displayed by either the one or more portals 150 and/or the display interfaces 195 and/or any of the plurality of third-party applications 175. Examples of display notifications may include, but are not limited to, the interface graphics as seen in FIGS. 7-11.

Figure 3:
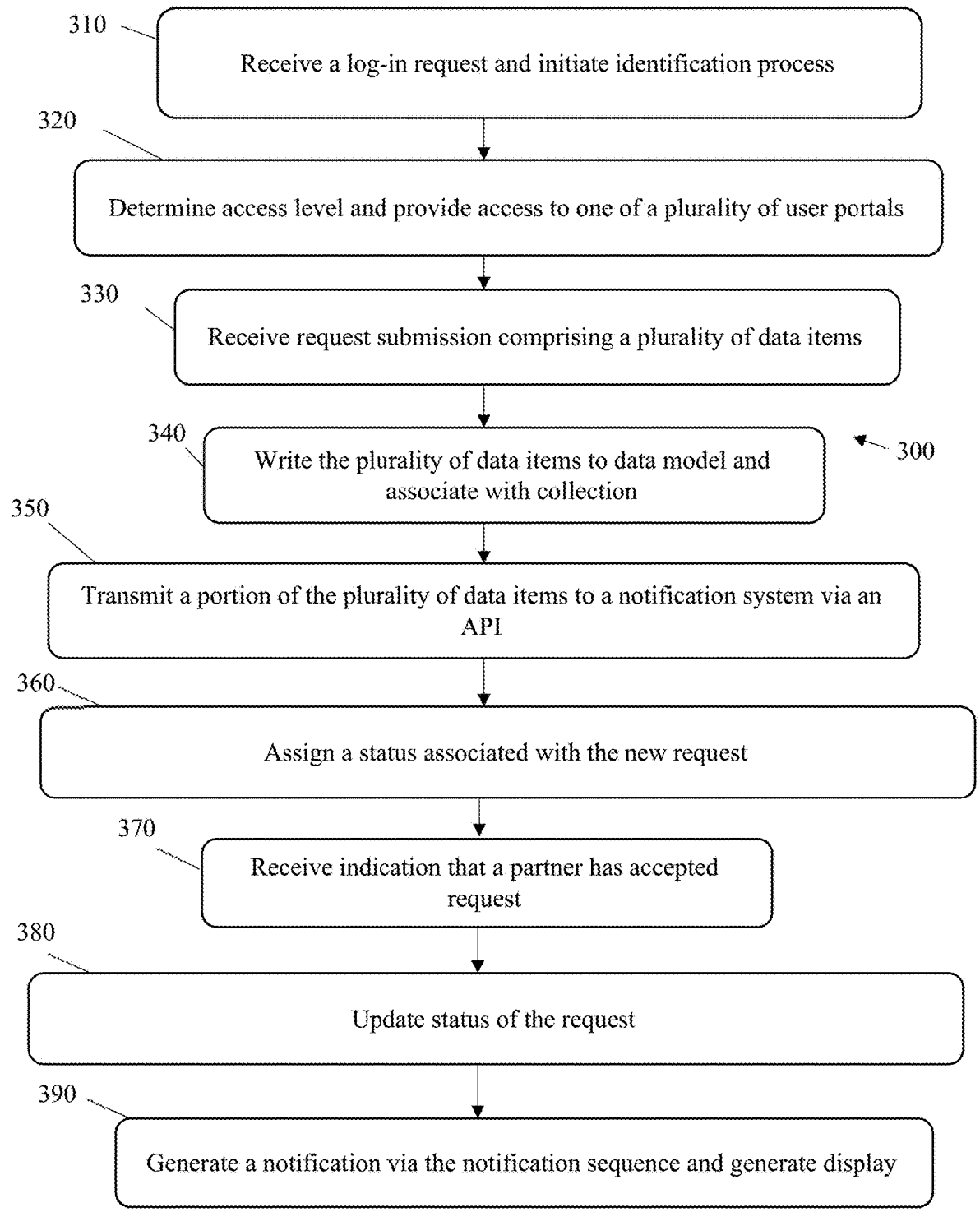
FIG. 3 is a flow diagram of a process for synchronization across disparate applications according to embodiments of the present disclosure.

FIG. 3 illustrates a synchronization process 300 for receiving, processing, and updating a notification for a request based on a status of the request. At step 310, the system 100 receives a log-in request and initiates the authentication and identification process using the authentication service 180, as discussed in relation to step 210 of FIG. 2.

At step 320, the system 100 determines the access level associated with the authenticated account log-in and provides access to one of the plurality of user portals, as described in connection with step 220 of FIG. 2.

In step 330, the system 100 receives a new request submission including a plurality of data items received as inputs from the one or more portals 150. The system writes the plurality of data items to the data model 120 in step 340.

In step 350, the system sends information to the notification queue 190 indicating that a new request has been received. In response, in various embodiments, the notification queue 190 creates a new event associated with the request, wherein the new event includes a unique identification tag. As will be understood from discussions herein, the new event and unique identification tag may be created by any suitable component of the system and may be written to the data model 120 as associated with the request (e.g., as part of a document associated with a collection).

At step 360, the system generates a status associated with the new request. In some embodiments, the status is "pending" and is linked to the request's new event with a timestamp when the request was logged in the notification queue 190. The notification queue 190 can generate a request notification and distribute the notification via a notification API, as described in the notification sequence of FIG. 5. The request notification can include one or more of a plurality of data items associated with the request, and the system may cause display of the notification via one or more third-party applications 175, portals 150, and/or display interfaces 195.

In step 370, when the system 100 receives indication that a request has been accepted. According to some embodiments, the system 100 received the indication that the request has been accepted via a notification, text message, email, and/or via the one or more third-party applications, portals 150, and/or display interfaces 195.

At step 380, the system updates the status of the request (e.g., at the data model 120). In various embodiments, the system may update the status of the request to any suitable status, including, but not limited to, "pending," "accepted," "failed," "in progress," "confirmed," etc. In some embodiments, the system can send an update via an API to the notification queue 190, wherein the notification queue 190 updates the status associated with the request.

In step 390, the notification queue 190 generates a notification via the notification sequence of FIG. 5 and generates a notification and/or causes a display to display the notification.

As will be understood, the system may take another suitable actions in response to changing the status of a request (or receiving notification that a partner has accepted the request). For example, upon receiving an indication of acceptance of a particular request, the system may remove or retract a notification form a particular display for a non-accepting partner.

Figure 4:
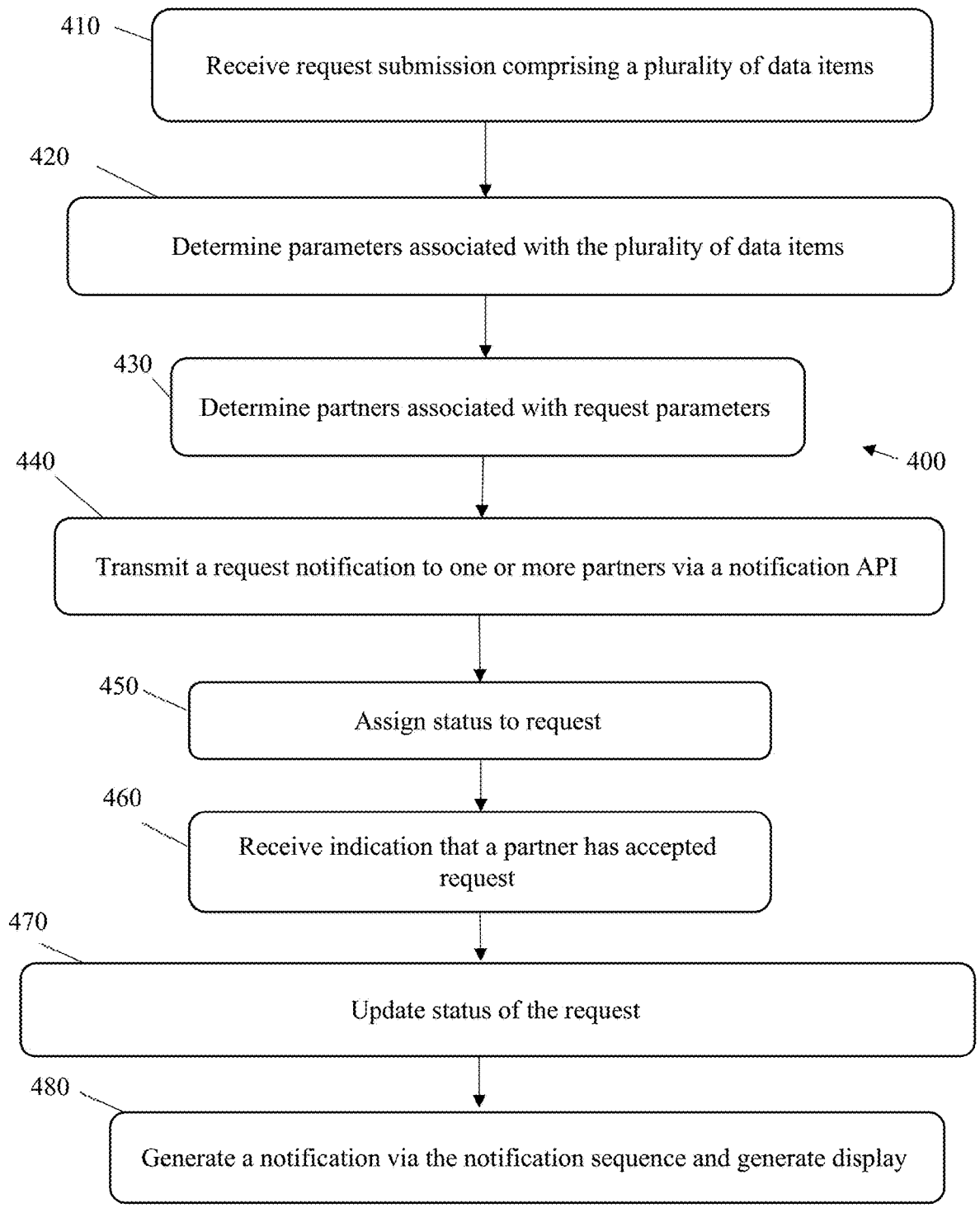
FIG. 4 is a flow diagram of a deployment process utilized in the synchronization process according to embodiments of the present disclosure.

FIG. 4 illustrates a deployment process 400 for distributing a request submission according to one or more parameters of one or more of the plurality of data items contained in a request. The deployment process 400 may be initiated by system when a request submission is received, for example in steps 230 or 330 of FIGS. 2 and 3, respectively. The deployment process 400 may include a deployment sequence configured to efficiently process, manage, and distribute requests to one or more partners based on a plurality of factors. In one embodiment, the deployment process 400 helps identify the parameters associated with a particular request, as determined by a plurality of data items stored in the data model 120 associated with the unique identification tag of the account 155 and/or the event. In one example, the plurality of data items associated with the unique identification tag of the account 155 may include settings for a particular account that apply to every request submitted for the account 155. In another example, the plurality of data items associated with the unique identification tag of the event may include one or more data items specific to a particular request and not necessarily associated with other requests submitted by the same account 155.

The deployment process 400 helps identify partners with specific characteristics to fulfill one or more request parameters. These characteristics may include, but are not limited to, a partner's: skill(s), specialty, available services, capacity, availability, location, and available languages. By utilizing a dynamic and advanced analytics system for providing a recommendation for eligible and available partners to fulfill a request, the deployment process 400 helps facilitate an efficient request handling system to minimize cancellations and appropriately allocate available resources.

Beginning at step 410, the system 100 receives a new request submission via, at least, one or more portals 150, wherein the new request includes a plurality of data items associated with fields of a request form and/or settings from an account 155 the request was submitted from. The plurality of data items are stored in the data model 120 and the deployment process 400 is initiated.

At step 420, the deployment system requests the plurality of data items associated with a request from the data model 120 and extracts the one or more data items associated with specific parameters of the request. In some embodiments, the deployment process may be initiated after the one or more data items associated with specific parameters are extracted, and the extraction process may be completed by the webservices integrator 170, one or more of the computing devices 130, and/or one of the third-party applications 175. In one embodiment, the specific parameters are transformed or linked to one or more of the characteristics described above, wherein the characteristics correspond to attributes saved in a data model 120 associated with one or more partners.

At step 430, the deployment system compares the data items associated with the parameters of the request to the partner attributes saved in the data model 120 and identifies the partners that can fulfill the request requirements. At step 440, the deployment system receives the request notification via a notification API from, for example, step 390 in FIG. 3, and transmits the request notification to the one or more partners that can fulfill the request requirements.

The deployment process 400 can further include a deployment sequence that is initiated at step 440. The deployment sequence can utilize an advanced analysis technique to determine a value associated with each partner. The value may be associated on a number of the characteristics described above, for each partner who can provide the requirements of the request parameter. In one example, the deployment sequence requests and transmits an initial request notification to any number of partners identified with the ability to fulfill a request. In this example, the initial request notification is transmitted to the partners within a specific radius of the location indicated for the request. If the initial request notification is acknowledged and accepted by a partner, the deployment sequence may terminate the initial request notification to the other partners who received the initial request and send a status update request to the notification queue 190.

If the initial request notification is unanswered for a specified period of time, the system may request and transmit a second request notification. The second request notification can either be transmitted to the same partners as the initial request notification, or the system may expand the location distance to identify additional partners that could fulfill the request. This process at step 440 can be repeated for a plurality of expanding radii or other factors until the request notification is accepted.

Once the request notification is transmitted, at step 450 the system communicates with the notification queue 190 to assign a "pending" status to the request. Once the request notification has been accepted by a partner, at step 460 the system communicates with the notification queue 190 to update the request status to "confirmed." In one embodiment, when the system updates the request status, a notification can be generated and transmitted via the notification API, to indicate the request has been confirmed by a partner. In various embodiments, the unique identification tag associated with the request is linked to the unique identification tag associated with the account of the partner, and this information is stored in the data model 120.

In some embodiments, if the partner subsequently cancels the request, the deployment process 400 will start over, the system will receive a cancellation notice and will update the request status to "pending" until a new partner accepts the request. In this example, the deployment sequence will exclude the partner who previously cancelled the request, in the subsequent transmittals of the request notification. In one embodiment, the system may transmit the initial request notification only to the partner with the highest value, and then transmit a second notification to the partner with the second highest value if the partner with the highest value fails to accept the request within a specified time. In this example, the value can be calculated by evaluating a number of the different characteristics, including but not limited to: distance of partner from the request source, and rating of the partner. Wherein a shorter distance from the partner to the request source will result in a higher value, and a higher rating of the partner will result in a higher value. Ratings of the partner may be associated with surveys and manual evaluations of service, through objective monitoring of completion time, number of available parameters, engagement with the system 100, or a plurality of other factors.

In another example, the system may also distribute requests using one or more auction systems. In at least one embodiment, the system leverages an auction system after multiple unsuccessful attempts to elicit a request acceptance under step 440. In one embodiment, the system may distribute the request notification to a plurality of partners within a specified region near the request source, and allow the partners to place a bid on the request. Once the bid value reaches a threshold amount and/or a specified period of time expires, the partner with the highest bid value will be confirmed as the assigned partner. Another method of auction deployment includes the system distributing a request notification to a plurality of partners, wherein the partner(s) are permitted to modify the request to provide an adjusted cost parameter. The request notification is then packaged and transmitted back to the one or more providers (or other account types) to be considered and accepted or alternative cost recommendations provided with subsequent sending and receiving of notifications as necessary.

FIG. 5 illustrates a process 500 for initiating a notification sequence, wherein the notification sequence is executed by the notification queue 190 and can be integrated with the system 100. As described above, the notification queue 190 can also communicate and/or integrate with third-party applications 175 to generate and transmit notifications related to events other than those generated by the system 100.

Beginning in step 510, the system 100 and/or the webservices integrator 170 receives indication that a request submission is received, for example in steps 230 or 330 of FIGS. 2 and 3, respectively.

In step 520, the webservices indicator 170 initiates the notification sequence by sending a signal to the notification queue 190 via an API. The notification queue 190 creates a new event with a timestamp upon initiation, wherein the new event is associated with the request.

At step 530, the notification queue 190 generates or receives a plurality of data items from the data model 120 via an API, wherein the plurality of data items provides details and information related to the request.

At step 540, the notification queue 190 creates a unique reference identification tag associated with the new event and linked to the request.

In step 550, the notification queue packages the plurality of data associated with the request as a notification to be transmitted via a notification API. As described in step 280 of FIG. 2, the notification queue 190 is also configured to receive a plurality of data items from third-party applications 175. In some embodiments, the plurality of data items from the third-party applications 175 are also stored in the data model 120 and can be retrieved in the same API where the plurality of data items associated with the original request are retrieved from the data model 120. In at least this way, the system may minimize system load demands and can create custom APIs to handle and process data dynamically. In some embodiments, the system 100 may utilize multiple data models 120 that may send and receive data to any of the system components or third-party applications 175.

In various embodiments, the notification queue can include a memory structure and store the request notification in the notification queue 190. The notification queue 190 can store the message for any predetermined amount of time, until a particular process is initiated, and/or until a particular set of rules are met. The notification queue 190 can also be configured to operatively communicate with the application load balancer 160 and the webservice integrator 170 to wait to send request notification(s) until the processing demands on the system 100 are less than a preconfigured threshold or a scalable percentage of the processing power of the system 100.

At step 560, the notification queue 190 determines the access level associated with the unique identification tag for the account generating the request, or the request source, and the account to receive the initial request notification, typically the one or more partners. In some embodiments, the request notification may also be sent to an administrator, with the plurality of data items included in the request notification capable of varying depending on the access level associated with the account of the notification recipient.

In various embodiments, the one or more request notifications are packaged in one or more notification APIs and distributed according to, in one embodiment, the deployment process 400 of FIG. 4. In some embodiments, step 560 can be repeated for generating and transmitting/displaying a plurality of request notifications according to the requests of the deployment sequence in step 440. Once a request notification is accepted, the notification queue 190 receives a signal to update the status of the request in step 570. The status is typically updated to "confirmed." However, in some embodiments, the status can be updated to a number of other statuses based on the signals and communications to/from the deployment process 400, the webservices indicator 170, and any number of other processes and systems. The notification queue 190 updates the status associated with a request, and in some embodiments can add a new event with a new timestamp associated with the original event in step 580. In some embodiments, the new event created is called a "job" or task and can also be configured with a unique identification tag, linked or otherwise associated with the unique identification tag for the original event. In a nonlimiting embodiment, an event generated from a request may include any number of associated events to track tasks, commands, and status updates as requests and data are handled throughout the plurality of systems, subsystems, processes, and applications that may be in communication with the notification queue 190.

In step 590, the notification queue 190 packages the plurality of data items associated with the new event, updated status, and any modified data items generated or received associated with the request, and transmits the updated request notification via an updated notification API to the one or more plurality of portals 150, display interfaces 195, third-party applications 175, or similar. Similar to the original request notifications, the updated notification APIs can be customized based on the access level of the recipient and include different portions of the plurality of data items according to what may be relevant to the recipient.

The system, in step 595, generates or initiates the generation of the display(s) for the updated notification API according to access level. The process 500 for generating and updating notifications using the notification queue 190 can be repeated any number of times for a single request or event, including to send reminders, resend request notifications after a cancellation, to send auction alerts according to some embodiments described in connection with FIG. 4, and other alerts and notifications requested by the system 100 or third-party applications 175.

Figure 6:
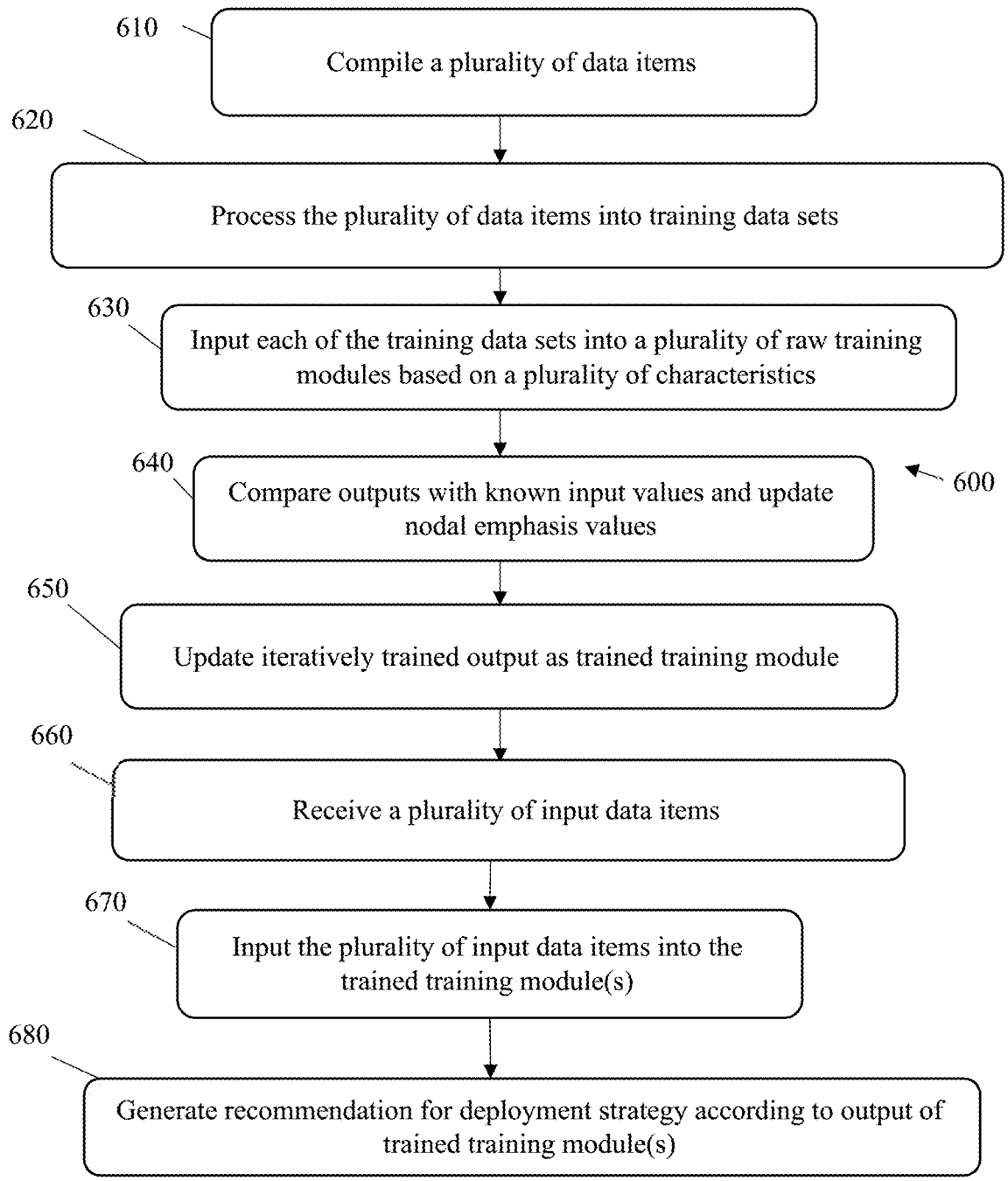
FIG. 6 is a flow diagram of a process for iteratively training a deployment sequence according to embodiments of the present disclosure.

FIG. 6 illustrates a process 600 for iteratively training a deployment sequence according to embodiments of the present disclosure. The process 600 can be configured to perform various advanced data analysis and modeling processes. In one example, the process 600 generates and iteratively trains training modules for providing dynamic deployment and request matching recommendations. For example, the process 600 can be configured to generate, train, and execute a plurality of nodes, neural networks, gradient boosting algorithms, mutual information classifiers, random forest classifications, and other machine learning and artificial intelligence related algorithms.

At step 610, the system compiles (or retrieves from one or more data models 120) a plurality of data items including a known characteristic or parameter value that is used to iteratively train one or more raw training modules to create a plurality of trained training modules.

At step 620, the system can input a data set of a plurality of data items as a training data set, or a plurality of training data sets. In step 630, each of the training data set(s) are input into a raw training module based on the data type of the collection type or container associated with the one or more data items. In one non-limiting example, this allows the system to iteratively train the training modules based on a plurality of input data sets of different data types, including data provided by specific accounts or specific request types.

At step 640, the output can then be compared to the known characteristic value(s) for the input training data set. One or more nodal emphasis values of the system can be updated for a plurality of nodes within the raw training modules based on the results of the comparing step, in order to iteratively train and improve the training module in step 650.

At step 650, when the output of the raw training module (s) is within a preconfigured threshold of the known characteristic values for the input training data sets, as determined during the compare step of 640, the plurality of raw training modules are output as trained training modules.

The system in step 660, can receive and process a plurality of input data sets associated with a specific request type, wherein each of the plurality of input data sets have a plurality of data items. In one embodiment, a specific request type may have multiple associated data sets. In step 670, the system can input each of the plurality of input data sets through a trained training module based on the request type.

The system, in step 680, receives a plurality of characteristic values as outputs from the plurality of trained training modules. In at least this way, system can utilize a plurality of trained training modules to output specific recommendations tailored to certain characteristic values. In one example, if a request has a characteristic value based on partner rating, the system can use a training module based primarily on the characteristic value of the partner rating. Alternatively, the system could also utilize a combination of multiple training modules where partner rating is one of a plurality of characteristic values, in addition to distance from the request source, wherein the process 600 can recognize and provide recommendation based in part on account settings stored in one or more portals 150. For example, the process 600 may evaluate a specific request type and display a recommendation for a partner that has a lower rating, but that meets the basic request parameters and is saved within the account's preferred partner list. It will be appreciated by one skilled in the art that a combination of multiple characteristic values can be used in a single training loop to provide a customized deployment recommendation based on a high level of certainty.

In step 680, the system determines a deployment recommendation based on the characteristic value(s) and modifies a display based on the deployment recommendation(s).

Also, the system can include one or more secondary metrics as parameters in one or more processes to iteratively train a training module or a plurality of training modules. When used throughout the present disclosure, one skilled in the art will understand that processes for "iteratively training the training module" can include machine learning processes, artificial intelligence processes, and other similar advanced machine learning processes. For example, the system and processes of the present disclosure can validate account demands for a plurality of requests and can validate partners covered by insurance, in one example, in addition to calculating estimated capacity within a service network as an input to an iterative training process for a deployment recommendation based on a plurality of request parameters and adjustable characteristic values.

FIGS. 7-11 illustrate examples of interface graphics that may include, but are not limited to, the plurality of portals 150, the display interfaces 195, and the display notifications, described in connection with FIGS. 2-5. In one embodiment, the plurality of portals 150 can include a provider/customer portal, an administrator portal, and a partner portal.

The provider/customer portal can include one or more request forms for submitting requests. Requests may include, but are not limited to, transportation requests, interpretation requests, telemedicine requests, delivery requests, comprehensive medicine reviews (CMRs), and other types of service requests. While these specific examples are related to healthcare-services, it will be appreciated by those skilled in the art that requests may include other types of service requests and product requests. The provider/customer portal may have a limited access level, including the access to only requests associated with a provider/customer's particular account 155. The provider/customer have the ability to upload and save preferences to their account 155, including insurance verification, contact information, preferred partners, and other information.

The administrator portal can include a comprehensive overview of requests, request statuses, partners, organizations, invoices, reports, schedules, and other information and system features. In some embodiments, the administrator portal contains unlimited access to the system features. For example, the administrator may have the ability to reassign a particular request from one partner to another, whereas a partner may only have the ability to accept or reject a particular request deployed to that partner.

The partner portal can include a list of requests deployed to and accepted by a particular partner. The partner may have an access level that allows for requests to be viewed, managed, and tracked in a partner-specific workflow. The partner portal can also provide an overview of request details including, but not limited to, the type of request and any specific request parameters or attributes. Request attributes may include, but are not limited to, a transportation-specific attribute, a language-specific attribute, and other types of service-specific attributes. In one example, a transportation-specific attribute may include the type of car (e.g., sedan, van, oversized, etc.) or may include features of a particular transportation (e.g., wheelchair-accessible, carseat, seatbelt extender). In one example, a language-specific attribute may include speaking a specific language or otherwise accommodating for a language or speech barrier. Request attributes may further include a plurality of features designed to accommodate a range of disabilities or provider preferences. The partner portal includes partner account settings, where a partner can input partner attributes, wherein the partner attributes include the specific capabilities and request attributes they can accommodate. For example, if a partner has a sedan with a wheelchair ramp and is fluent in American Sign Language (ASL), the partner's profile within the partner portal can be configured with these details. These partner attributes can be used with the systems and processes described herein to facilitate efficient deployment of service requests, so that service requests are deployed to partners with corresponding partner attributes to fulfill the request attributes required. In at least this way, the present system helps prevent cancellations.

In various embodiments, the system may be configured to modify a display (monitor, mobile device, etc.) to display any suitable information discussed herein. In one or more embodiments, the system may be configured to modify a display to show invoicing and billing information. In at least some embodiments, the system is configured to summarize information related to a specific request, partner, provider, or administrator (e.g., based on data written and stored at the data model 120) and display this summary.

Figure 7:
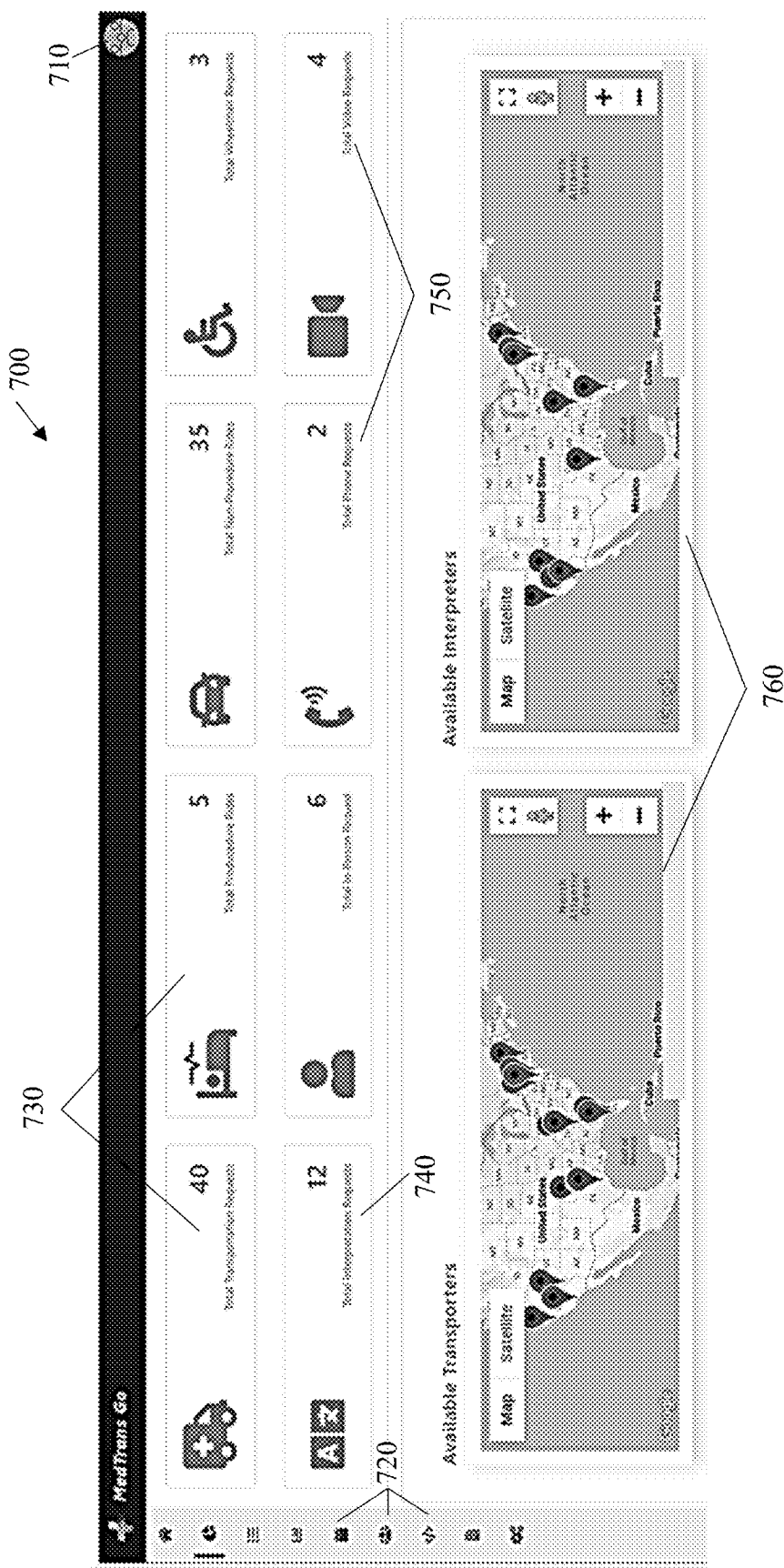
FIG. 7 illustrates a graphical interface display showing a portal dashboard according to embodiments of the present disclosure.

FIG. 7 illustrates an example of a portal dashboard 700, wherein the dashboard 700 can be one of the plurality of portals 150. In this example, the dashboard 700 can be accessed when there is an authenticated log-in request associated with a registered account 710. The specific dashboard 700 is representative of a provider/customer portal, but can be customized to indicate and display the features and notifications associated with either an administrator portal or a partner portal. The dashboard 700 provides access to a plurality of system features, wherein the system features can be accessed from interactive feature icons 720. System features may include, but are not limited to requests, request statuses, partners, organizations, invoices, reports, schedules, and notifications. The portal dashboard 700 may show transportation requests 730 including total transportation requests, and requests specific to certain service types, like surgical or ambulatory procedures. These transportation requests may also include specific transportation-request attributes, like home-assistance required, wheelchair accessible vehicles, etc. The dashboard 700 may also include a list of interpreter requests 740, which may include one or more language-specific attributes. The dashboard 700 may additionally include a list of requests related to both visits 750, where visits may include both in person healthcare-related visits and telemedicine requests. The dashboard 700 can also include location mapping 760 including a visualization of registered and available partners based on a specific region. The selections on the dashboard 700 and the system features 720 may integrate and/or connect to third-party services or third-party applications 175 in order to populate information. For example, the visits 750 may be integrated with a calendar and/or videoconferencing feature in order to populate calendar invites and/or videoconferencing links when a new visit request is confirmed. As will be understood from discussions herein, data associated with requests, including third-party services (such as calendar, videoconferencing, and invoicing) data (including URLs, time spent on videoconferences, dates, times, attendees, etc.) is written to a data model (e.g., data model 120) as discussed herein. Requests and other information can be automatically populated on the portal dashboard 700 in response to the submission request and notification processes, as well as other processes, described in connection with FIGS. 2-6.

Figure 8:
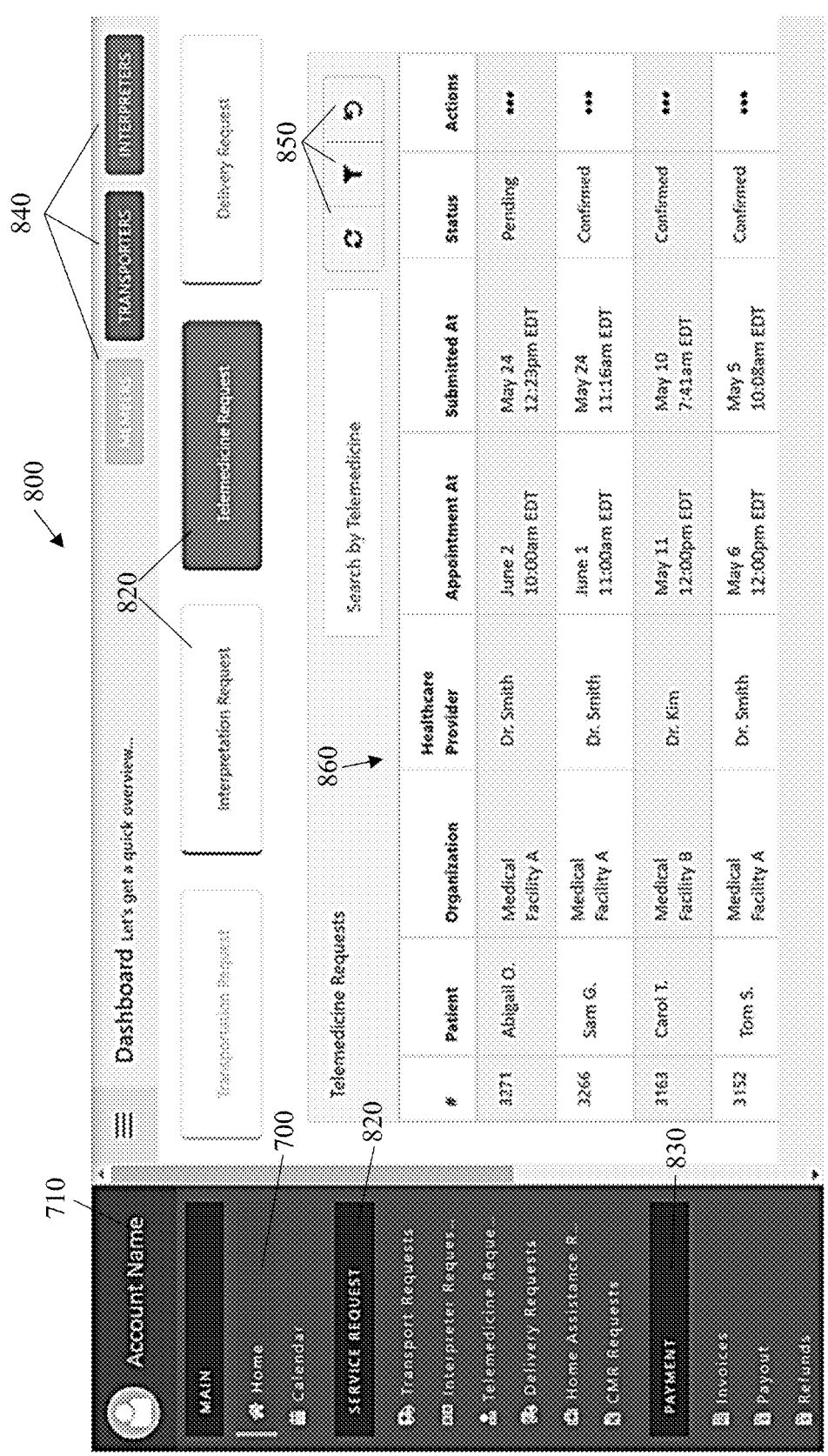
FIG. 8 illustrates a graphical interface display showing a portal view according to embodiments of the present disclosure.

FIG. 8 illustrates another example of a portal view 800, wherein the view 800 may be accessed by selecting one of the interactive icons from the dashboard 700. The view 800 can include a plurality of screens and interface options for one or more service requests 820 and payment features 830. Examples of service requests 820 can include, but are not limited to, transportation requests, interpretation requests, telemedicine requests, delivery requests (including prescription deliveries), home assistance requests, and CMR requests. Payment requests 830 may include invoices, payouts, refunds, and other financial metrics. The specific data items displayed in each of the various screens and interfaces can be altered depending on the access level of the account 155. For example, in the administrator portal, the view 800 can be configured to view service requests 820 or payments 830 for specific partners 840, whereas in the provider/customer portal the service requests 820 or payments 830 would be limited only to those requests and payments associated with the provider/customer's account 155. The view 800 can further be customized to provide a plurality of data items 860 associated with a specific request or service type. These data items 860 can be dynamically updated as the system receives new data and/or requests are modified and updated.

Figure 9:
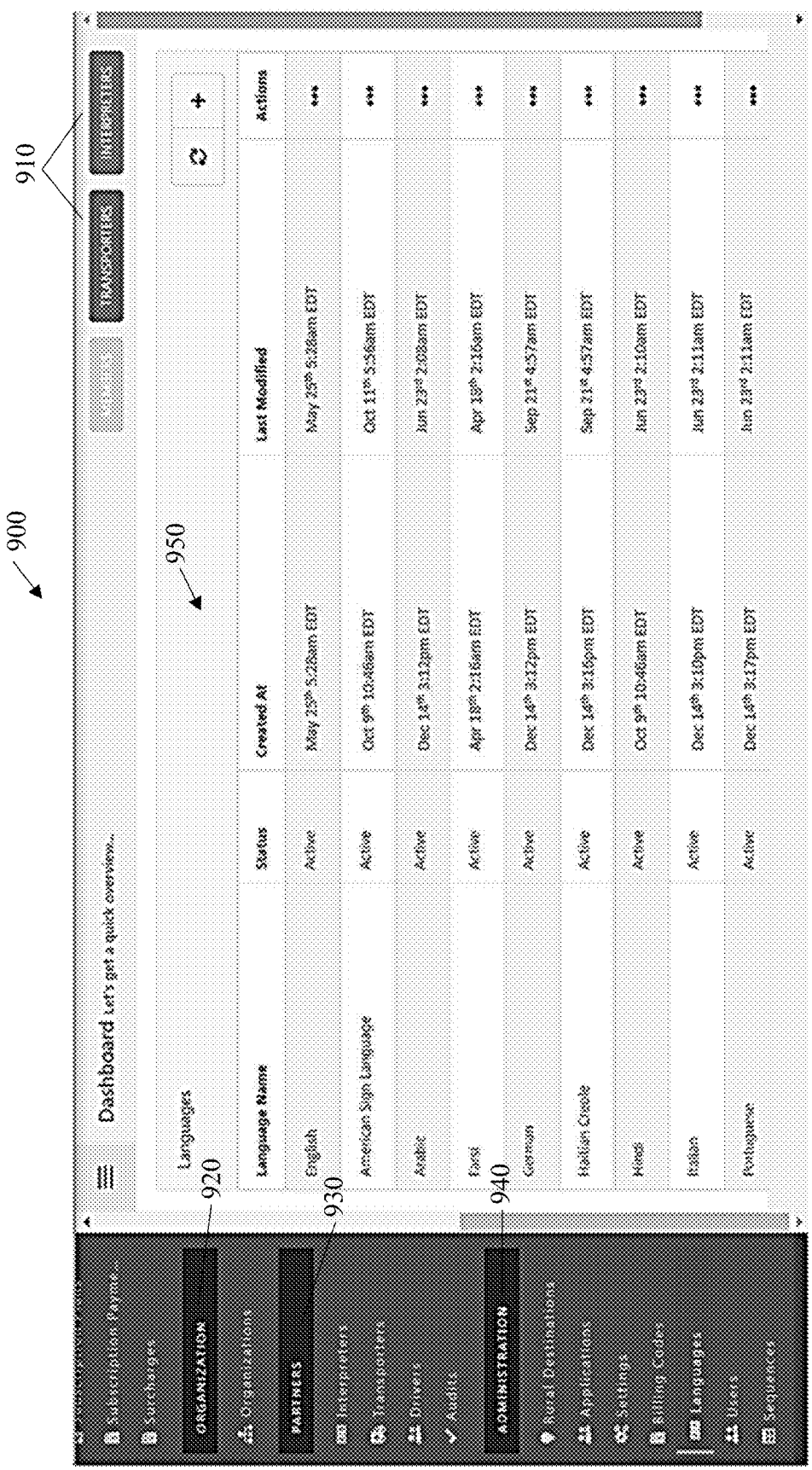
FIG. 9 illustrates a graphical interface display showing a portal view for an administrator according to embodiments of the present disclosure.

FIG. 9 illustrates another example of a portal view 900, wherein the view 900 may be an administrator portal, accessed by an authenticated login by a registered administrator account 155. The view 900 can include a plurality of screens and interface options for viewing, modifying, and generating reports associated with multiple aspects of the systems and processes disclosed herein. For example, the plurality of screens may be configured to display data items associated with requests (not shown), organizations 920, partners 930, and other system features 940, including other options and information. These screens can be further filtered or customized by interactive filter and sorting options 910 on each screen. The data items 950 can include request attributes, user input information, recommendations for deployment strategies (as described in connection with FIG. 6) or other types of information generated by the systems and processes described herein. The view 900 can further be customized to provide a plurality of data items 950 associated with a specific request or service type. These data items 950 can be dynamically updated as the system receives new data and/or requests are modified and updated.

Figure 10:
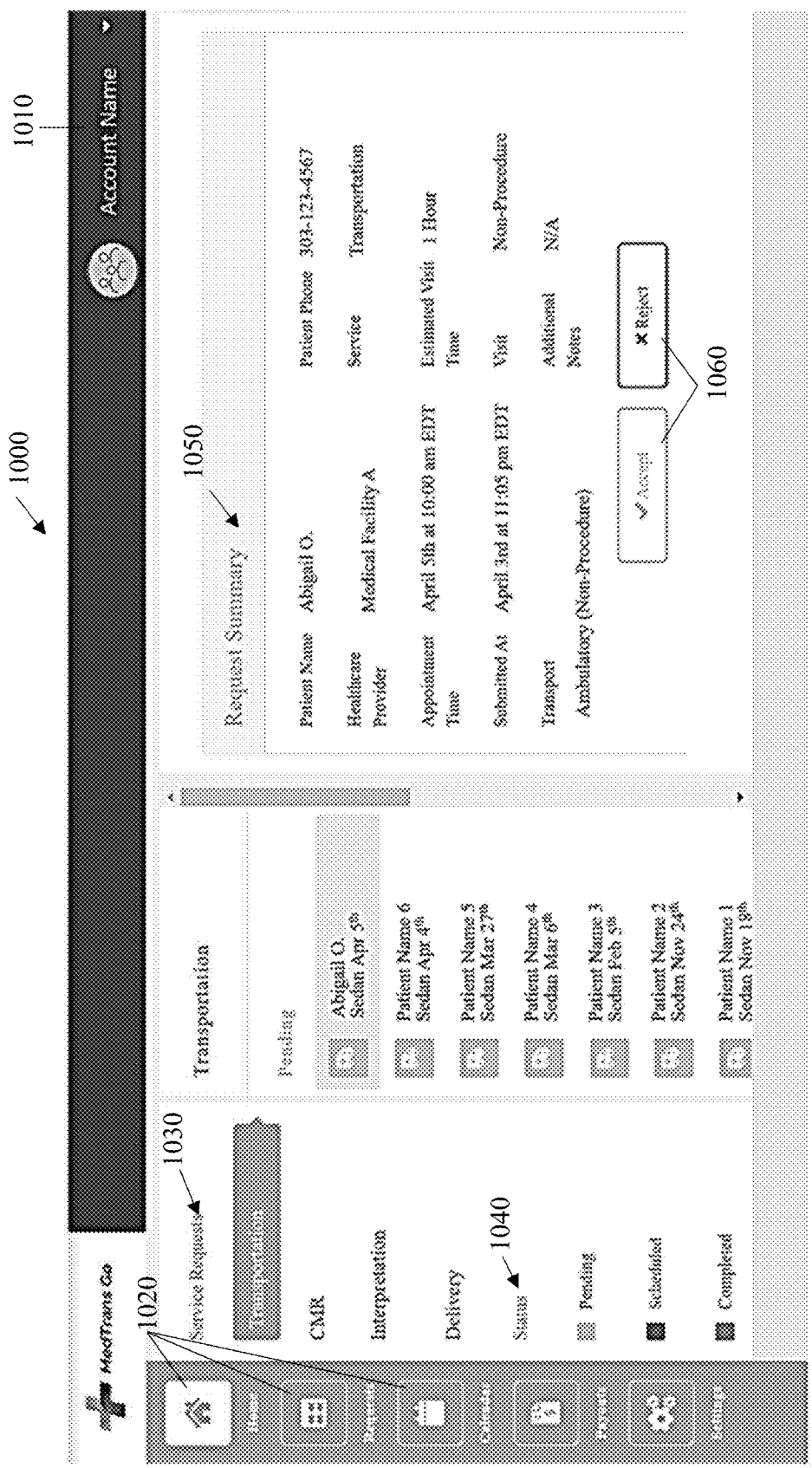
FIG. 10 illustrates a graphical interface display showing a portal view for a partner according to embodiments of the present disclosure.

FIG. 10 illustrates an example of one embodiment of a partner portal view 1000, wherein the partner portal can be one of the plurality of portals 150. In this example, the partner portal can be accessed when there is an authenticated log-in request associated with a registered partner account 1010. The partner portal provides access to a plurality of system features, wherein the system features can be accessed from interactive feature icons 1020. In contrast to the administrator portal, the partner portal view 1000 has limited access and only shows features related to service requests 1030 deployed to the partner, accepted by or confirmed by the partner, completed by the partner, or cancelled by the partner. In some embodiments, requests deployed to a particular partner may display a notification only while the request is pending. In this example, when the pending request is rejected by the partner, or accepted by another partner, the pending request notification can be automatically removed from the partner portal view 1000.

Additionally, the partner portal view 1000 can automatically update and display a request status 1040, according at least to the systems and processes 300, 400, and 500 described in connection with FIGS. 3-5, and other processes. The systems and processes described herein can be configured to deploy request notifications to partners based on a dynamic and scalable system of identifying and matching request attributes to partner attributes. For example, the transportation service requests 1030 include one or more request attributes, that are captured when a submission request is made. These request attributes may include the specific transportation-request attributes, like home-assistance required, wheelchair accessible vehicles, etc. and may also include one or more language-specific attributes. These service attributes can be viewed in a request summary 1050 that includes details regarding the specific request. A service request 1030 notification can be deployed according to the deployment process 400, described in connection with FIG. 4, to a partner with the capability to perform or provide the request attributes, as indicated by the account profile of the partner. When the partner receives the request notification, the partner can view the request summary 1050 through the partner portal view 1000 and choose to either accept or reject the request using interactive buttons 1060.

In some embodiments, the auction feature described in connection with the deployment process 400 of FIG. 4, can be implemented using a version of the partner portal view 1000, wherein an additional interactive button 1060 can include an "auction" feature for the partner to place a bid on a service request. The view 1000 can include a plurality of screens and interface options for one or more service features 1020 and service requests 1030 and may further include options to customize the layout or content displayed in the view 1000, according to a partner's account settings.

Figure 11:
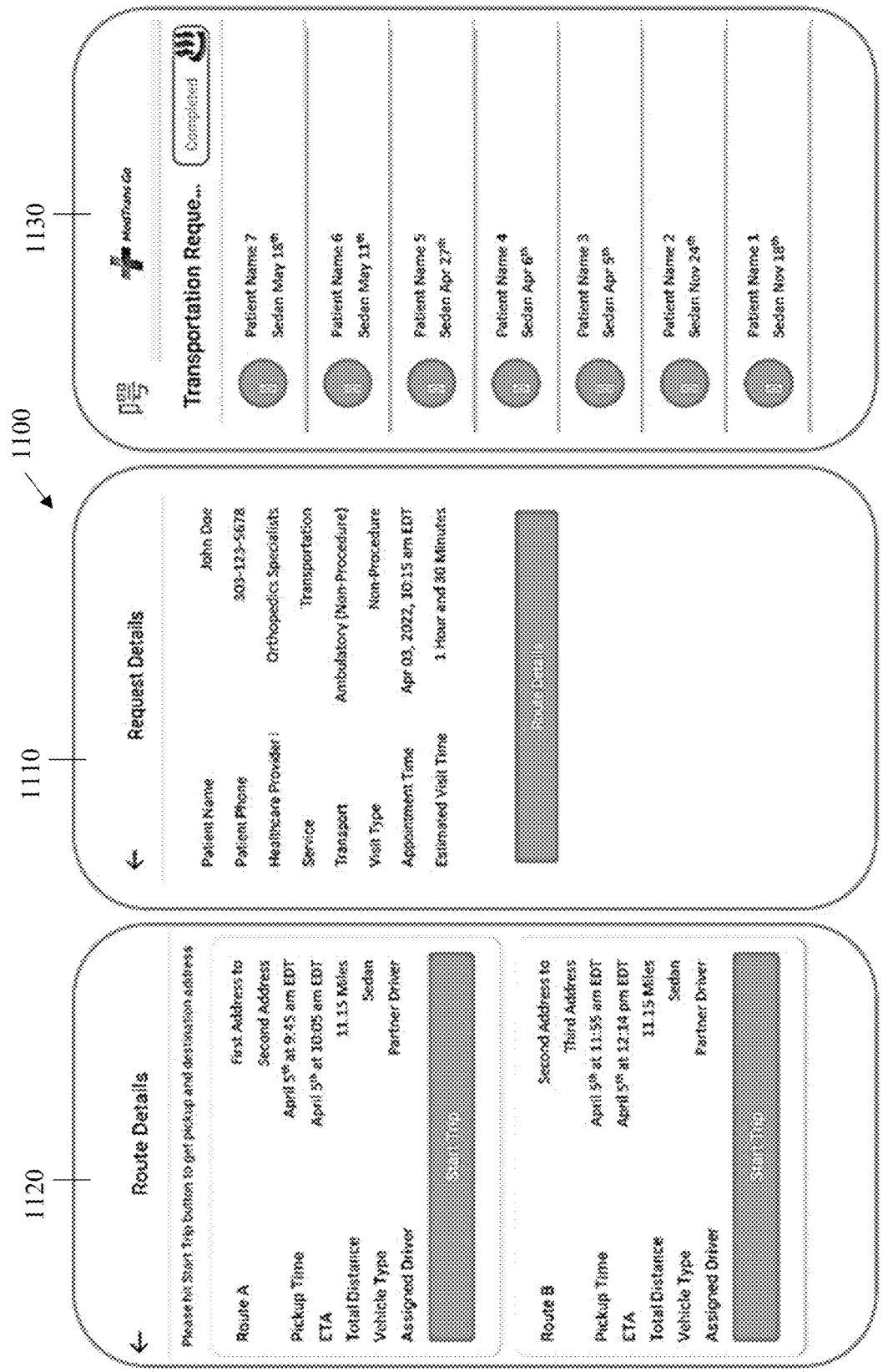
FIG. 11 illustrates a graphical interface display showing a portal view configured for a mobile device interface according to embodiments of the present disclosure.

FIG. 11 illustrates an example of one embodiment of a partner portal view 1100, wherein the partner portal can be one of the plurality of portals 150 and may be accessed from a mobile display interface 195. In this example, the partner portal can be accessed when there is an authenticated log-in request associated with a registered partner account. The partner portal view 1100 may include multiple screens and selectable options, including request details 1110 with patient information and a summary of the request attributes, route details 1120 displaying recommended options for how to complete a transportation request, for example, and a request summary 1130 when a list of accepted or confirmed requests assigned to the partner associated with the partner log-in. It will be appreciated by one skilled in the art that any of the interfaces and views 700, 800, 900, and 1000, shown in connection with FIGS. 7-10 can likewise be modified to a mobile version or otherwise adapted to be viewed on a tablet or other portable device. The graphic interfaces shown in FIGS. 7-11 can also be integrated or linked to one or more third-party applications 175 or third-party services to provide a cohesive user experience and further synchronize processes between a plurality of systems.

In one embodiment, the system can be used to synchronize a provider request for transportation to healthcare facility for an appointment with specific patient attributes and additional service requests. As a non-limiting example of this embodiment, a surgeon (i.e., provider) can submit a request for post-operative physical therapy treatments and the system can synchronize between a plurality of different systems and third-party applications 175 to fulfill the request according to specific patient attributes. For example, the surgeon can log-in to an account 155 and access the provider/customer portal 150. The surgeon can then input a request submission for post-operative physical therapy for a patient who was just released after a procedure. The system receives the request and can store the specific request parameters in the data model 120. These request parameters can include data items like the patient's name and contact information, as well as information saved to the surgeon's profile. The surgeon's profile could include a plurality of settings related to specific procedures. In one embodiment, the surgeon's request form could be customized to provide one or more drop-down or other selection mechanisms, so that when the surgeon inputs a post-operative physical therapy request, they can select a specific procedure performed on the patient and the system will recognize that the patient will be in a wheelchair post-surgery. In this example, the request for a physical therapy appointment would automatically store the wheelchair parameter with the request, as a data item associated with the request in the data model 120, without the surgeon needing to manually input that the specific patient is in a wheelchair.

In this example, once the request is submitted, the system can generate and deploy a notification to one or more partners using the systems and processes described herein, and at least in connection with FIGS. 2-6. In this example, the system would generate a notification including the request parameters, including at least, the patient's location, the service request type of physical therapy, a request service type of transportation with the specific attribute requirement of wheelchair-enabled transportation. It will be appreciated by one skilled in the art that the request could include different and/or additional requirements and also include a plurality of provider-specific notes regarding the patient's condition, care, or requirements.

In this example, the deployment system 400 can generate and distribute one or more notifications to partners located within a specific region within a specific radius of the patient. For example, the system may deploy multiple notification requests, including but not limited to, a first request for transportation services and a second request for physical therapy services. In this example, the first request would only be deployed to partners registered to provide transportation services in the specified radius, and only to those transportation partners with a partner attribute associated with providing wheelchair accommodations. This is only one example of what could be a plurality of partner attributes saved to a partner profile and used for matching requests to eligible partners during the deployment process 400, and other processes as described herein. In this example, the second request would be deployed only to partners with a partner attribute including providing physical therapy services. This could include, but is not limited to, specific certifications or trainings related to a specific condition the patient has. The system could also request and compare one or more data items associated with the patient and/or partner's insurance coverage and acceptance, to further improve the advanced deployment and synchronization processes described herein.

It will be appreciated by one skilled in the art that this embodiment is only a non-limiting example used to illustrate that the system and processes are configured to dynamically provide a notification and deployment sequence, and other processes, for synchronizing requests and information across a plurality of systems and applications, as can be applicable for a plurality of different services.

While the particular embodiments described herein relate to healthcare-based applications. It will be recognized and appreciated that the systems and processes described herein are also applicable to at least, but not including, other types of services. For example, the systems and methods described herein could be used to manage and synchronize systems related to babysitting or childcare services, speech pathology, cleaning services, repairs, home improvement, contract work, landscaping, meal prep, dog grooming, information governance (e.g., shredding, filing, scanning, etc.), software development, training or workshops, event planning, marketing, construction, legal services, personal training, photography, etc.

A non-limiting example of an embodiment of the disclosed system and processes used for babysitting services is included herein as an illustrative example of the various embodiments and applications of the disclosed system and processes. In this example, a parent, as the provider/customer can create an account 155 and/or log-in to a provider portal 150. The parent can create a submission request including their request parameters. Wherein the request parameters may include the specific childcare needs associated with the request (e.g., days/times, number of children, special needs, sign language, dietary restrictions, allergies, sleep schedule(s), transportation services, tutoring, limited screen time, etc.). This information can be stored in the data model 120 as part of the account profile for the parent to be automatically applied to multiple requests, and/or only as related to a specific request like a weekend babysitter for a special out-of-town event. The system can then use the notification queue 190 and deployment sequence described in connection with FIGS. 2-5 to generate and deploy a notification to one or more babysitter partners registered with the system.

In one embodiment of this example, using the deployment sequence 400, the system can prioritize the request notification to babysitters with specific partner attributes saved in their profile (e.g., CPR certified, valid driver's license, sign language certified, availability during the days/times requested, etc.). The system may also prioritize the deployment to only babysitters within a 10-mile radius of the parent's zip code, in one example. The system may additionally only deploy the notification to babysitters with verified ratings from other parents. The system can also integrate with one or more third-party services 175 to automatically set up a video conferencing interview consultation when a parent has never used a particular babysitter before, or may alternative recognize that a partner has worked with a parent before, is listed as a preferred partner for the parent, and automatically confirm the arrangement according to calendaring services embedded or integrated with the system. Once a particular babysitter partner has accepted and/or been confirmed for a specific request, the notification queue 190 can remove the pending notification to any other partners the notification was deployed to. If the confirmed partner cancels for some reason, the system can automatically deploy a new request notification according to embodiments of the system and processes described herein.

It will be appreciated by one skilled in the art that this embodiment is only a non-limiting example used to illustrate that the system and processes are configured to dynamically provide a notification and deployment sequence, and other processes, for synchronizing requests and information across a plurality of systems and applications, as can be applicable for a plurality of different services and industries.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices, such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device, or other common network node, and typically include many or all of the elements described above relative to the main computer system in which the systems are embodied. The logical connections between computers include a LAN, a WAN, virtual networks (WAN or LAN), and wireless LAN ("WLAN") that are presented here by way of example and not limitation. Such networking environments are commonplace in office-wide or enterprise-wide computer networks, intranets, and the Internet.

When used in a LAN or WLAN networking environment, a computer system implementing aspects of the system is connected to the local network through a network interface or adapter. When used in a WAN or WLAN networking environment, the computer may include a modem, a wireless link, or other mechanisms for establishing communications over the WAN, such as the Internet. In a networked environment, program modules depicted relative to the computer, or portions thereof, may be stored in a remote data storage device. It will be appreciated that the network connections described or shown are non-limiting examples and other mechanisms of establishing communications over WAN or the Internet may be used.

Additional aspects, features, and processes of the claimed systems will be readily discernible from the description herein, by those of ordinary skill in the art. Many embodiments and adaptations of the disclosure and claimed systems other than those herein described, as well as many variations, modifications, and equivalent arrangements and processes, will be apparent from or reasonably suggested by the disclosure and the description thereof, without departing from the substance or scope of the claims. Furthermore, any sequence(s) and/or temporal order of steps of various processes described and claimed herein are those considered to be the best mode contemplated for carrying out the claimed systems. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems. In addition, some steps may be carried out simultaneously, contemporaneously, or in synchronization with other steps.

Aspects, features, and benefits of the claimed devices and processes for using the same will become apparent from the information disclosed in the exhibits and the other applications as incorporated by reference. Variations and modifications to the disclosed systems and processes may be affected without departing from the spirit and scope of the novel concepts of the disclosure.

It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates.

The description of the disclosed embodiments has been presented only for the purposes of illustration and description and is not intended to be exhaustive or to limit the devices and processes for using the same to the precise forms disclosed. Many modifications and variations are possible in light of the above teaching.

The embodiments were chosen and described in order to explain the principles of the devices and processes for using the same and their practical application so as to enable others skilled in the art to utilize the devices and processes for using the same and various embodiments and with various modifications as are suited to the particular use contemplated. Alternative embodiments will become apparent to those skilled in the art to which the present devices and processes for using the same pertain without departing from their spirit and scope. Accordingly, the scope of the present devices and processes for using the same is defined by the appended claims rather than the description and the embodiments described therein.

What is claimed is:

1. A computing architecture comprising:
   a JSON document memory store comprising a collection associated with a particular entity and a particular access level of a plurality of access levels; and
   a processor communicably connected to the JSON document memory store and configured for:
   receiving a log-in request from the particular entity;
   based on receiving the log-in request, providing access to a portal associated with the particular access level of the particular entity;
   receiving a first request from the particular entity via the portal, the first request comprising a plurality of first data items, the plurality of first data items comprising an indication of one or more third-party services;
   writing the plurality of first data items to a first document associated with the collection;
   providing at least one of the plurality of first data items to the one or more third-party services via a first application programming interface (API);
   receiving third-party data derived from the particular entity using the one or more third-party services;
   writing the third-party data to the first document;
   transmitting a portion of the third-party data and at least one data item of the plurality of first data items to a notification system via a second API, whereby the notification system transmits a notification to the particular entity;
   receiving a second request from the particular entity via the portal, the second request comprising a plurality of second data items, the plurality of second data items comprising an indication of one or more partner services and a partner attribute;
   writing the plurality of second data items to a second document associated with the collection; and
   determining that a particular partner service of the one or more partner services comprises the partner attribute.

2. The computing architecture of claim 1, wherein the plurality of access levels comprise administrator, provider, and partner.

3. The computing architecture of claim 2, wherein the third-party data is associated with a request identifier.

4. The computing architecture of claim 1, wherein the processor is further configured for facilitating a notification to the particular partner service, the notification comprising at least one of the plurality of second data items.

5. The computing architecture of claim 4, wherein facilitating the notification to the particular partner service comprises transmitting the at least one second data items to a notification system via a notification API.

6. The computing architecture of claim 1, wherein the partner attribute comprises a transportation-specific attribute or a language-specific attribute.

7. The computing architecture of claim 6, wherein the transportation-specific attribute comprises wheelchair accessibility.

8. The computing architecture of claim 7, wherein the language-specific attribute comprises speaking a specific language.

9. A computing process comprising:
   receiving, via at least one processor, a log-in request from a particular entity;
   based on receiving the log-in request, providing access to a portal associated with a particular access level of the particular entity;
   receiving a first request from the particular entity via the portal, the first request comprising a plurality of first data items, the plurality of first data items comprising an indication of one or more third-party services;
   writing the plurality of first data items to a first document associated with a collection of a JSON document memory store associated with the particular entity;
   providing at least one of the plurality of first data items to the one or more third-party services via a first application programming interface (API);
   receiving third-party data derived from the particular entity using the one or more third-party services;
   writing the third-party data to the first document;
   transmitting a portion of the third-party data and at least one data item of the plurality of first data items to a notification system via a second API, whereby the notification system transmits a notification to the particular entity;
   receiving a second request from the particular entity via the portal, the second request comprising a plurality of second data items, the plurality of second data items comprising an indication of one or more partner services and a partner attribute;
   writing the plurality of second data items to a second document associated with the collection; and
   determining that a particular partner service of the one or more partner services comprises the partner attribute.

10. The computing process of claim 9, wherein the plurality of access levels comprise administrator, provider, and partner.

11. The computing process of claim 10, wherein the third-party data is associated with a request identifier.

12. The computing process of claim 9, wherein the processor is further configured for facilitating a notification to the particular partner service, the notification comprising at least one of the plurality of second data items.

13. The computing process of claim 12, wherein facilitating the notification to the particular partner service comprises transmitting the at least one second data items to a notification system via a notification API.

14. The computing process of claim 9, wherein the partner attribute comprises a transportation-specific attribute or a language-specific attribute.

15. The computing process of claim 14, wherein the transportation-specific attribute comprises wheelchair accessibility.

16. The computing process of claim 15, wherein the language-specific attribute comprises speaking a specific language.

* * * * *